(12) United States Patent
Harvey (10) Patent No.: US 9,086,261 B2
(45) Date of Patent: Jul. 21, 2015

(54) IDENTIFIABLE PROJECTILES AND METHODS TO MAKE IDENTIFIABLE PROJECTILES FOR FIREARMS

(71) Applicant: Thomas Danaher Harvey, Rockville, MD (US)

(72) Inventor: Thomas Danaher Harvey, Rockville, MD (US)

( * ) Notice: Subject to any disclaimer, the term of this patent is extended or adjusted under 35 U.S.C. 154(b) by 0 days.

(21) Appl. No.: 14/509,109

(22) Filed: Oct. 8, 2014

(65) Prior Publication Data

US 2015/0033973 A1    Feb. 5, 2015

(51) Int. Cl.
| | |
|---|---|
| *F42B 30/00* | (2006.01) |
| *F42B 33/00* | (2006.01) |
| *B21J 9/06* | (2006.01) |
| *F42B 12/00* | (2006.01) |
| *G09F 23/00* | (2006.01) |
| *G09F 3/02* | (2006.01) |
| *F42B 35/00* | (2006.01) |

(52) U.S. Cl.
CPC . *F42B 33/00* (2013.01); *B21J 9/06* (2013.01); *F42B 12/00* (2013.01); *G09F 3/02* (2013.01); *G09F 23/00* (2013.01); *F42B 35/00* (2013.01)

(58) Field of Classification Search
CPC ................................ F42B 33/00; B21K 21/06
USPC .................................. 86/51, 54, 55; 102/501
See application file for complete search history.

(56) References Cited

U.S. PATENT DOCUMENTS

| | | | | |
|---|---|---|---|---|
| 776,056 | A | * | 11/1904 | Haase ................................ 86/55 |
| 1,275,669 | A | * | 8/1918 | Forbes ........................ 102/513 |
| 1,887,324 | A | | 1/1930 | Pocoroba |
| 1,769,263 | A | * | 7/1930 | Johnson ............................ 86/54 |
| 2,336,143 | A | * | 12/1943 | Werme .............................. 86/55 |
| 4,150,624 | A | | 4/1979 | Hammond |
| 4,300,379 | A | * | 11/1981 | Johnson et al. .................. 72/258 |
| 5,485,789 | A | | 1/1996 | Collier |
| 5,511,483 | A | * | 4/1996 | Griffin, Jr. ..................... 102/501 |
| 5,646,365 | A | | 7/1997 | Collier |
| 5,698,816 | A | | 12/1997 | Roxby |
| 6,209,459 | B1 | * | 4/2001 | Kaufman et al. ............. 102/439 |
| 7,143,697 | B2 | | 12/2006 | Mace |
| 7,240,619 | B2 | * | 7/2007 | Kinoshita ..................... 102/430 |
| 7,533,614 | B1 | * | 5/2009 | Reich ............................ 102/430 |
| 2008/0236709 | A1 | * | 10/2008 | Kusinski et al. ............. 148/579 |

* cited by examiner

*Primary Examiner* — Gabriel Klein (57) ABSTRACT

The current invention is directed to a cost effective method of manufacturing bullets or projectiles for firearms which are identifiable after firing and undergoing damage. The mass production of low cost ammunition makes adoption of a requirement that projectiles be so identifiable unlikely unless manufacturing methods and costs are not substantially disrupted.

The method envisioned produces projectile bodies from rod or wire stock by encasing identification tag material, and swaging a projectile body with a wholly or partially encased tag with indicia. The stock may be extruded around premade identification tags or a recess may be reverse extruded in each slug. The tags may have repeated indicia in each projectile and some indicia may be accessible from the outside of a completed round of ammunition. The swaging process retains the identification tags which are protected by the body of the projectile for recovery after the projectile is used.

10 Claims, 10 Drawing Sheets

IDENTIFIABLE PROJECTILES AND METHODS TO MAKE IDENTIFIABLE PROJECTILES FOR FIREARMS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Present Invention

The present invention relates to a method of manufacturing bullets. More particularly, the present invention relates to a method of manufacturing bullets with an identification tag.

Background Concerning the Need for the Current Invention

There are hundreds of thousands of shootings of persons in the United States each year. In many of them, law enforcement agencies are tasked with identifying the shooter. One method of doing this is to trace the ownership of the gun involved. In some cases that can be done by examination of the striations on a projectile and comparison to a test projectile fired by the same gun. This method is limited to cases where the gun is identified and recovered for testing. Another method is to examine marks on casings left on the scene of the shooting. This method is limited to cases where casings are recovered and either a comparison test casing or the gun is available. Comparison methods in either of the two methods above are not suitable to building a database where the universe of guns in circulation is searched for an unknown weapon.

There are proposals and some adopted legislation to require new guns sold to mark cartridges fired with identifying marks to enable the identification of used cartridge casings which may be left and discovered after a shooting. These methods are limited by the need to recover casings and to new guns sold.

A third method of identification of shooters to which the current invention is directed is to provide for the tracing of projectiles through identification tags in or on the projectiles. This method has the advantage of only requiring recovery of the particular projectile or projectiles involved in a shooting. Unlike cartridge casings, projectiles are always left behind and nearly always recovered in shootings. Adoption of a requirement for appropriately identifiable projectiles is likely to be adopted only if such labeled ammunition can be readily manufactured.

In the absence of a mandate for identifiable projectiles, organizational users of firearms including law enforcement agencies and private guard agencies are likely to want certainty and provability in the use of their duty weapons. They are extremely concerned with being falsely or unfairly blamed for incidents where persons are harmed by firearms. Their approach to this matter has been moving from one of secrecy to one of transparency. In an earlier period in our history, secrecy in the details of incidents worked to protect agencies from blame; but the vast increase of information availability has made agencies rethink this problem. There has been a movement to transparency where the actual events of an incident are examined. An example of this is the adoption by many police agencies of body cameras to prove the correct behavior of officers in unfortunate incidents. Adoption of a system of identifiable projectiles can serve to allow proof of which officer or perhaps no officer fired the bullets that are in question.

Background Concerning the Need for Economy in Production Methods

There are currently approximately ten billion rounds of small arms ammunition manufactured annually in the United States. These are worth at wholesale prices about 1.8 billion dollars or about 18 cents per round. Because some ammunition sells for substantially higher prices the median price is likely to be well below the average price and could be in the neighborhood of 10 cents per round. It should be clear that the vast majority of this ammunition is and must be made by high production, low unit cost methods. The majority of the projectiles used are made by extruding lead billets into wire, parting the wire into slugs and pressing the slugs into the desired projectile shape.

If a requirement for making projectiles that are traceable in their production and ownership chain is implemented, methods of production to provide this traceability without excessive disruption of the existing methods will be needed. The current invention is directed to providing additional forming steps and the insertion of means of identification in light of this requirement. The several prior patents concerning projectile identification with their attempts to specify production methods other than the methods of the current invention show a long felt need for an efficient method of providing such a product.

Background Concerning Identification Tags, their Production, and Use

While some early methods of making projectiles that are identifiable involved stamping in the body material itself, most methods including those of the current invention involve placing a separate identification tag with indicia in or on the projectile.

Ideal identification tags would to be made of tough materials that can survive the stresses of firing and striking a hard target. They should of small size to prevent changing the ballistic characteristics of the projectile. They should be able to carry suitable indicia that do not limit the information content and perhaps multiple sets of indicia. There are many materials and designs that are possible, some of which are described below in specific embodiments. Many others are possible and practical.

One method of making identification tags that is used in a preferred embodiment is to laser mark or engrave a filament of tough plastic material such as fiber reinforced polycarbonate and cut it into lengths. The cutting can be combined with the parting of slugs to swage into projectiles or done separately. This method lends itself to mass production and to easy digital control of indicia that vary usually providing a separate serial number for each tag. There are many commercially available systems for producing suitable identification tags. One example is the Tri-Star Technologies M-100L laser based marking system which is capable of making vary small durable laser marks on wire insulation at high rates of speed. Tracing the identity of tags for batches can be facilitated by parting the wire or filament into short lengths at the time of projectile projection. A portion of the tag material can be used separately from the projectiles to facilitate tracking of the batches.

Background Concerning Recovery and Reading of Identification Tags

After a projectile is launched, it may be seriously distorted in shape. The embedded tag must be recovered for reading from the damaged projectile. There are several methods for recovering the identification tag. All of these methods are appropriate to various projectiles made by the methods here described.

One method is to cut apart the projectile and mechanically remove the tag. If the tag is made of a resilient material or covered and encased with a protective layer this may not be difficult to do. In some cases it may be desirable to limit the changes to the projectile in removing the chip so that the projectile remains available as evidence. Precise location of the identifying chip can be made by x-ray or other penetrating examination methods. Cutting can be accomplished with special thin blades or by means of wire electrical discharge machining (EDM) equipment.

Another method available in cases where the projectile is made of a low temperature melting metal and the identifying chip is made of a heat resisting material. Most of the prior art patents in the field of the current invention suggest recovering the identifying tag by melting the material of the projectile body. This may have limited use because of the higher cost of heat resisting identifying tags. It is particularly limiting in cases where the projectile body or its jacket are made of non-lead containing alloys and have a melting point higher than that of lead.

A third method which will be further explained in a preferred embodiment is to dissolve the material of the projectile in a strong solvent which does not affect the identification tag. In particular, metallic lead which is the most common material currently used for making projectiles is easily dissolved with dilute nitric acid. The acid should be dilute to avoid oxidizing a copper jacket and producing noxious fumes. Other mineral acids are available to dissolve most materials suggested to replace lead in future projectile manufacture. The identification chip can be made of a non-metallic or other solvent resistant material.

Prior Patents to be Distinguished from the Current Inventive Concept

There are several patents applied for or issued that address placing identification tags into or onto projectiles. The claims of these patents sometimes address manufacturing methods and sometimes are restricted to the organization and placement of tags and indicia. Their descriptions in many cases describe manufacturing methods not included in the claims. None of these describe the method of manufacture of the current invention.

U.S. Pat. No. 1,887,324 to Pocoroba describes an identification tag molded or cast into a projectile and does not address forming a projectile.

U.S. Pat. No. 4,150,624 to Hammond describes a projectile of low melting material with an identification tag of less fusible material. One method of manufacture described is the force fitting of a pin into a hole. This method does not describe the production of the projectile from a bar, rod or tube, does not specify a method for producing the hole and does not swage the tag into the hole after insertion.

U.S. Pat. No. 5,485,789 and U.S. Pat. No. 5,646,365 both to Collier describes a method of manufacture and a structure of a projectile with an embedded identification tag. They describe manufacture by molding from a molten source of metal and not by forming from slugs parted from a rod, wire or tube. The claims describe a structure but not a method of manufacture.

U.S. Pat. No. 5,511,483 to Griffin describes an identification tag in the body of a projectile. It describes a structure but not a method of manufacture.

U.S. Pat. No. 5,698,816 to Roxby describes projectile manufacture by insertion of a bullet core into a jacket encasing a previously inserted identification tag. It does not describe the manufacturing method for the bullet core or contemplate placing an identification tag into the bullet core.

U.S. Pat. No. 6,293,204 to Regen describes molding a projectile and injecting an identification tag into the still warm projectile body. It does not contemplate a process where a projectile is formed from a bar, rod, or tube of stock.

The differences described above between the current inventive concept and the patents cited are only illustrative and there are many other distinctions in each case.

Prior Patent for Reference

The patent in this section is referenced to provide clarity to the use of various technologies used in the embodiments described herein and to provide further enablement in the implementation of those embodiments.

The patent listed in this section is incorporated herein by reference in its entirety. Furthermore, where a definition or use of a term in a reference, which is incorporated by reference herein, is inconsistent or contrary to the definition of that term provided herein, the definition of that term provided herein applies and the definition of that term in the reference does not apply.

U.S. Pat. No. 7,143,697 to Mace describes ways to use identifiers placed on multiple components of an ammunition system to trace their connections for various purposes. It will be used to illustrate uses for the subject invention.

BRIEF SUMMARY OF THE INVENTION

The present invention is directed to identifiable projectiles or bullets for firearms and efficient methods for their production. It is directed to a process and the resulting projectiles made by extruding a rod which encases another rod, wire or filament of material to become identification tags. Indicia are printed, engraved or otherwise applied to the identification tag material. This process parts slugs from the resulting composite rod and swages the slugs into projectiles containing identification tags. The resulting projectiles may contain multiple indicia.

A process is also described for parting a slug from a rod of material and forming a recess in the slug by reverse extrusion. An identification tag is made of suitable material to be later separated from the projectile and inserted into the recess and the recess is closed by application of pressure in a swaging process. The projectile may be composed entirely of the slug and tag materials or may be further assembled with a jacket of a different material. The opening in the recess may be entirely closed or it may be necked down onto the identification tag retaining it positively or by pressure.

The tag may have exposed indicia or repeated indicia and may be resistant to the action of a solvent for the projectile body material. The present invention is also directed to projectiles made by the method described. The projectile may have both exposed and protected indicia.

BRIEF DESCRIPTION OF THE SEVERAL VIEWS OF THE DRAWING

The features and advantages of the various embodiments disclosed herein will be better understood with respect to the following drawings in which.

DETAILED DESCRIPTION OF THE INVENTION

Definitions

The definitions given in this section are intended to apply throughout the specification and in the claims.

Encasing a rod or an identification tag means to place it into a recess.

Extrusion is a process whereby material is forced into or through an opening forming an elongated shape. There are two kinds of extrusion commonly used as industrial processes, forward extrusion where the material is forced through an opening forming a bar or tube and backward extrusion where a punch enters the material forcing it in the opposite direction along the punch into a confined space. Unless specified otherwise herein, the term extrusion is intended to include both the forward extrusion and the backward extrusion processes.

An identification tag is an object which carries indicia and is associated with an object to be identified. It may be of any material including metals, metals less fusible than the object to be identified, nonmetals or materials not attacked by solvents or acids that would dissolve the object.

An exposed identification tag is an identification tag which has indicia which can be read by visual or instrumental methods without removing it from the object it serves to identify or damaging that object.

A protected identification tag is an identification tag which is sufficiently encased in the body of a projectile or an object to be identified that it is intended to survive use of the projectile for firing and striking a target.

Indicia are variations in physical properties that are arranged on or in an object to carry information. Indicia include both marks and symbols intended to be read visually and variations in physical properties including depth of surface and magnetic properties that can be read with the help of machines or instruments. Indicia include structures storing information to be delivered by radio frequency identification chips and other electronic devices when these are used as part of an identification tag.

Parting is a method of dividing a bar of material crosswise so that one or more pieces are produced that are suitable for further processes.

A projectile is a object intended to be used in a firearm as the part of a round of ammunition that is ejected from the weapon at a target. It is herein made by swaging a slug into a suitable shape.

A recess in a slug or projectile body is a concavity intended to accept an identification tag.

Retaining an identification tag in a slug or projectile body may be by complete encasement, by positive retention based on the shapes of the tag and the projectile body, or by pressure sufficient to retain the tag by friction.

A rod or bar of material includes a filament or wire and may be of finite length or be essentially continuous.

A slug is a portion of material parted from a bar, rod or wire and intended to be formed into a projectile body.

Swaging is the process of changing the shape of an object by applying external pressure sufficient to overcome any elasticity of the object and leave the object in a changed shape when the pressure is removed.

Description

The current invention envisions a method of producing identifiable projectiles by certain steps. Some of the steps by their nature must be accomplished in a specific order and other steps can be done in any one of several sequences. The first step envisioned is the provision of a rod of suitable material for composing a projectile body. This material is in most embodiments approximately the same diameter at the projectile to be produced, but it may be somewhat enlarged or reduced by forming steps.

The second step envisioned is the parting of a slug from the rod of material. This slug usually contains the amount of material for production of one projectile, but may have a excess if the particular process of a certain embodiment involves a trimming step.

The third step envisioned is the production of a recess for holding an identification tag. This step may be a separate operation after the parting or the recess may be formed in the bar prior to parting. The recess may have one opening or may have multiple openings to the surface so that the bar or slug forms a tube.

The fourth step envisioned is the placement of an identification tag into the recess. This may occur as a separate step after forming the recess or be accomplished by forming the bar around the identification tag, thereby simultaneously forming the recess and placing the tag in it.

The last step envisioned is swaging the slug to retain the identification tag. The slug becomes a projectile body and is formed to a suitable shape with an identification tag retained at least partially in it. A portion of the tag may remain exposed and this may allow identification of the projectile prior to use.

Together these steps, which may be performed in various sequences produce an identifiable projectile.

DETAILED DESCRIPTION OF THE DRAWING AND CERTAIN EMBODIMENTS

Figure 1:
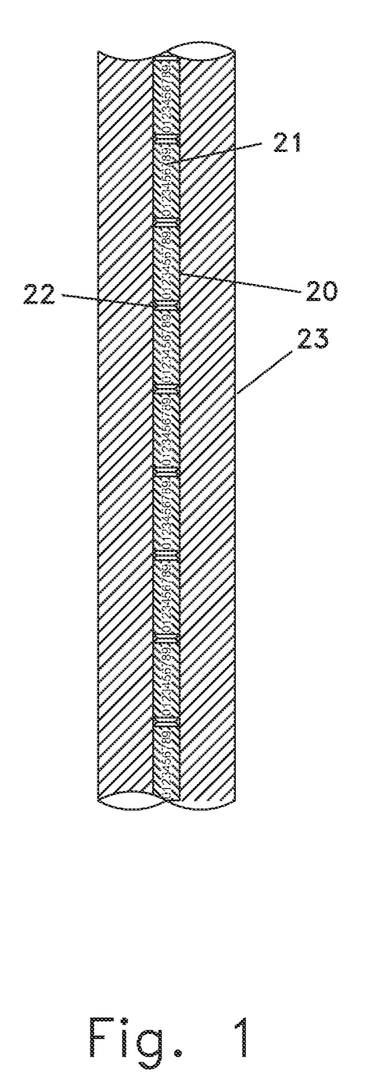
FIG. 1 is a section view of a rod of material 23 with an encased rod of id tag material 20 with multiple indicia 21. The rod is ready to be parted into multiple slugs.

Referring to FIG. 1, a rod 23 of material for production of slugs is depicted. The rod, also called a bar or wire is extruded around and encasing an inner rod 20 of material for identification tags. The inner rod has indicia 21 repeated along its length. There may be an array of notches 22 to control the breakup of the identification tags in subsequent manufacturing or use processes.

In a preferred embodiment for manufacture of the most common size of ammunition cartridges, the .22LR or 22 Long Rifle, the size of the rod would be 0.220 inches in diameter to allow forming of projectiles without excessive compressing or extending the slug material in forming or swaging its final shape. The encased filament or rod for becoming identification tags is here made of a fluorocarbon plastic material marked with indicia by a laser engraving process. Some versions have notches 22 that are produced by a rolling process during stock material manufacture. The identification tag material may in some versions be reinforced with a fiber content of glass, aramid or other suitable material. The preferred size for the identification tag material is 0.020 inches which is large enough to allow complex laser application of indicia but occupies less that 1% of the cross section of the rod or the projectile. This insures that the effect of inclusion of an identification tag on the ballistics of the projectile is negligible.

Figure 2:
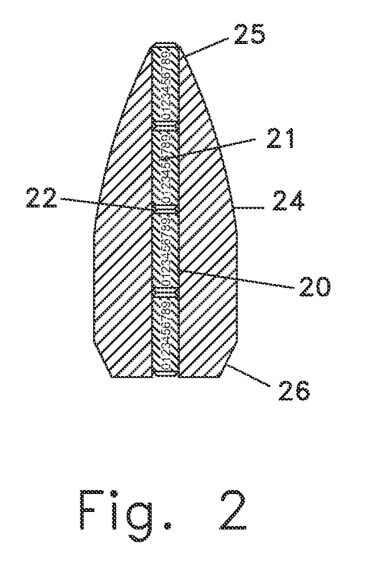
FIG. 2 is a section view of a projectile body 24 made from a slug from the rod of FIG. 1, showing the retention of the identification tag at the tail 26 and nose 25 by swaging.
Figure 3:
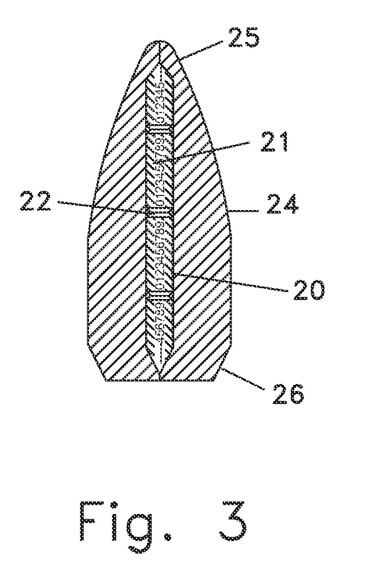
FIG. 3 is a section view of a projectile body 24 made from a slug from the rod of FIG. 1, showing closure of the body to retain the identification tag 20 at the tail 26 and nose 25 by swaging.

A projectile 24 formed from the bar of FIG. 1 is shown in FIG. 2. A slug is cut from the bar containing the amount of material required and in one or more steps the ends of the slug are swaged to the desired nose 25 and tail 26 contours. FIG. 2 is diagrammatic because the identification material is not shown distorted by the swaging of the body of the projectile 24. This distortion is shown in FIG. 3, which shows the case where the swaging pressure is sufficiently severe to close or nearly close the projectile body material around the identification tab material. The indicia on the stock bar are sufficiently closely spaced to insure that one or more repetitions are undamaged allowing identification tags recovered after projectile use to be read.

In the preferred .22LR embodiment the projectile is about 0.400 inches long allowing 5 repetitions of indicia with about 0.080 inches allowed for each. If one repetition is lost to manufacturing damage at each end then the remaining three repetitions have sufficient redundancy to allow recovery of information even from severely damaged projectiles. In the preferred embodiment the identification tag is reinforced with a fiber content and the indicia are coated with a protective material not adherent to the body material to allow the tag. The tag does not completely follow the elongation of the projectile body in the swaging process allowing the closure of the ends of the projectile over the ends of the identification tag.

Figure 4:
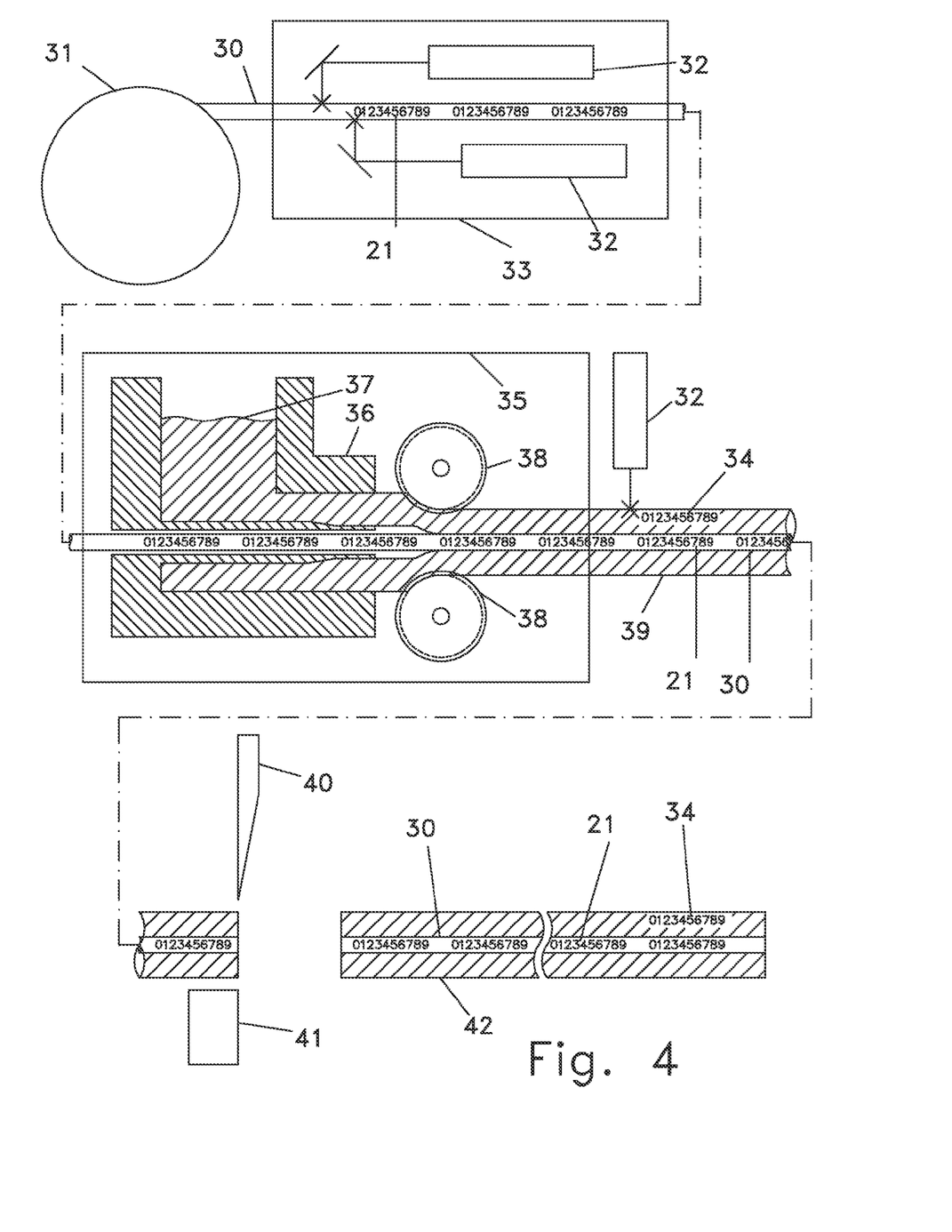
FIG. 4 shows a production line for the rod of material of FIG. 1. It shows identification tag stock material with indicia being applied, with a coating of slug material added, with indicia applied and being cut into sections.

Referring to FIG. 4 equipment and a method for making stock bars of material to be parted into slugs for making projectiles is depicted. It is here described as used for manufacture of the bar of FIG. 1 as needed for the preferred .22LR embodiment. A reel 31 provides a stock filament of identification tag material 30, with a diameter in the specific embodiment of 0.020 inch. The material is feed through a wire marking machine 33 with multiple lasers 32 which produce indicia 21 along its length. In the specific embodiment the indicia occur at multiple positions around the stock and repeat at 0.080 inch intervals along the length. This component of the production system can be an off the shelf wire marking machine such as the Tri-Star Technologies M-100L laser based marking system or a specially adapted machine for this process.

In some variations of this embodiment, the identification tag stock may be provided with notches, which are not shown in this figure, formed at the time of its manufacture and appropriate sensors may be used to allow the indicia to be placed in the desired relationship to the notches. In other variations the notches may be omitted or made by rolls added to this production system.

The identification tag filament them passes into a extrusion wire jacket machine 35. The jacketing of wire with lead or other soft metal coatings is a standard process. Continuous lead extruder systems are available such those supplied by H. Folke Sandelin AB of Sweden are in wide use. A material supply 37 supplies projectile body material to a hollow extrusion die 36 which provides a jacket encasing the identification tag material 30. Rolls 38 or in the alternative compression dies tighten the jacket around the identification tags. A marking laser or printer 32, synchronized with the application of indicia provides indicia 34 on the outside of the material.

The continuous rod 39 of stock with encased identification tag material is sheared into lengths 42 by upper 40 and lower 41 knives. In the preferred .22LR embodiment each length would provide enough material to produce one box of 50 cartridges which would require each rod to be about 20 inches long. The continuous rod production system described would have the lowest unit cost in very large quantity production. There are many simpler batch production methods for lower quantity production situations. For example, extruded slug material in the form of cut length tubes can be assembled with lengths of tag material marked with indicia. The pressure of the projectile swaging process can serve to tightly encase the identification tag.

Figure 5:
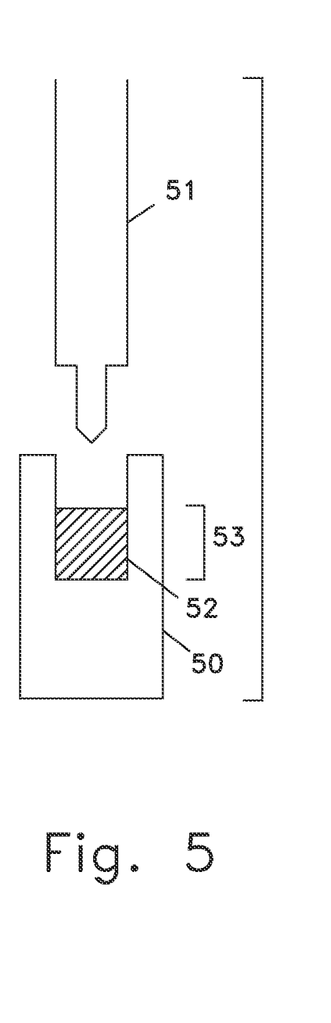
FIG. 5 is a section view of a die 50 with a reverse extrusion punch 51, ready to reverse extrude a slug 52.
Figure 6:
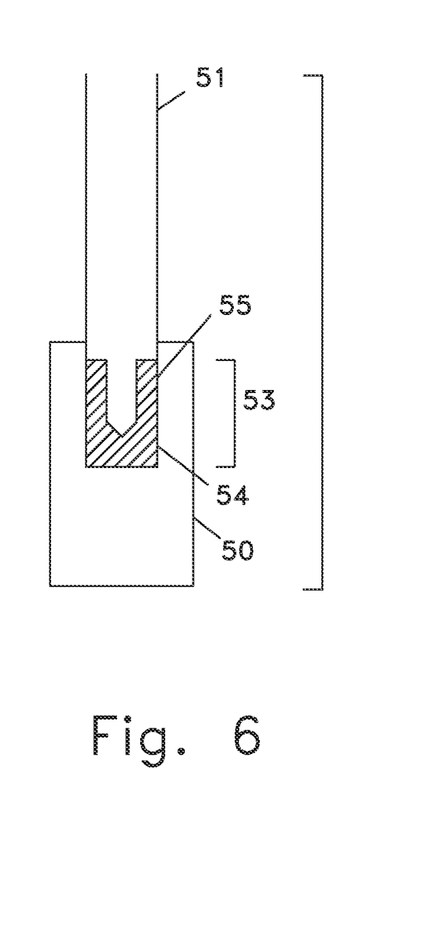
FIG. 6 is a section view of the die, punch and slug of FIG. 5 after reverse extrusion.

Referring to FIG. 5 a slug of material 52 having a height dimension 53 is in place in an extrusion die 50 ready to be reverse extruded by the advance of a punch 51. Referring to FIG. 6 the punch has advanced and forced the material of the slug back along the length of the punch increasing the height dimension 53. The slug is now a reverse extruded slug 55 and has a cup shape. There is a tubular portion 55 which can be used in subsequent processes. In the depicted case, the extruded slug has a cup shape; but in other cases the extruded slug may be entirely pierced by the punch and have a tubular shape.

Figure 7:
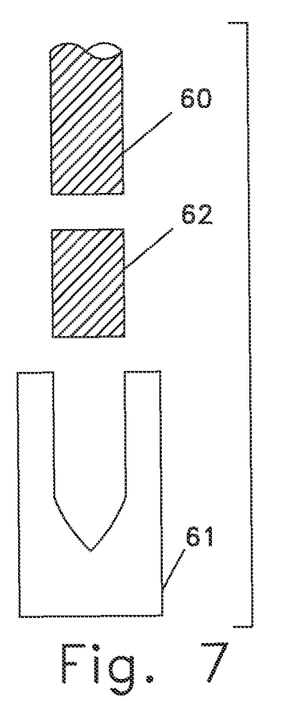
FIG. 7 is a section view of a projectile forming die 61, a slug 62 and a bar of metal stock 60.

Referring to FIG. 7, a projectile forming die 61 and a slug 62 are depicted. The die is shaped and sized to receive the slug with contours at the bottom of the cavity to form the front of the projectile to be made. The slug has the proper amount of a formable metal to produce the desired projectile and has been parted from the extruded rod 60 of metal stock. The metal stock can also be referred to as a bar or wire. In other similar embodiments the stock or the slug can be hollow or tubular. It may already contain the stock for the identifying tag that will be added here in different step of the projectile making process.

Figure 8:
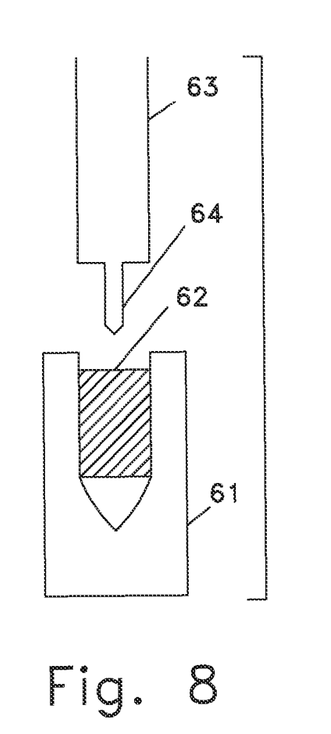
FIG. 8 is a section view of the forming die and the slug with the slug inserted into the die and an extruding punch 63 with a piercing tip 64.

Referring to FIG. 8, a extruding punch 63 with a piercing tip 64 is added to the components of FIG. 7. In a typical manufacturing setup the punch and die are mounted in a press.

Figure 9:
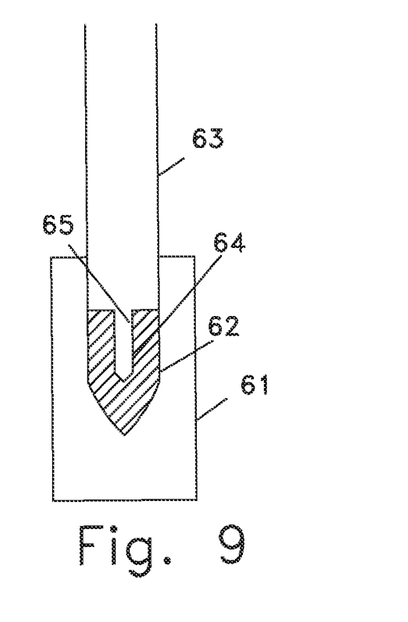
FIG. 9 is a section view of the die and slug with the punch advanced to form a recess 65 in the slug.

Referring to FIG. 9, the extruding punch 63 is advanced by the pressure of the press. The pressure transferred by the punch causes the metal of the slug to flow reverse extruding it into a tubular shape and in this case forming the proper shape at the front of the projectile. The reverse extrusion creates a recess 65 in the rear of the slug.

Figure 10:
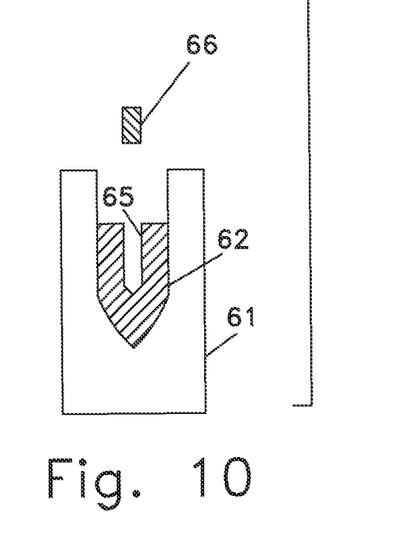
FIG. 10 is a section view of the forming die and the slug and an identification tag 66.

Referring to FIG. 10, an identification tag 66 is shown in position to be placed into the recess in the projectile. The identification tag carries indicia which are not shown in this figure.

Figure 11:
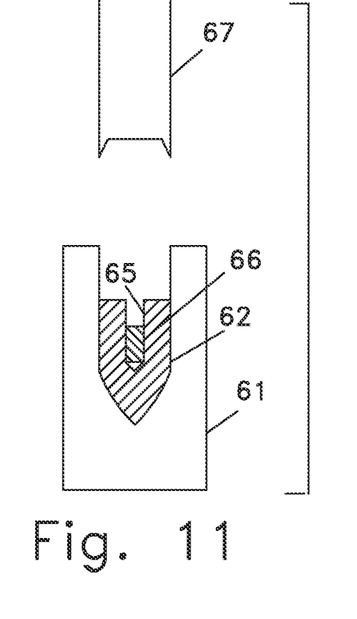
FIG. 11 is a section view of the die, slug, tag and a swaging punch 67.

Referring to FIG. 11, the identification tag has been placed in the recess in the projectile and a swaging punch 67 is positioned in readiness to be used to swage the opening of the recess and to retain the identification tag in its place in the recess.

Figure 12:
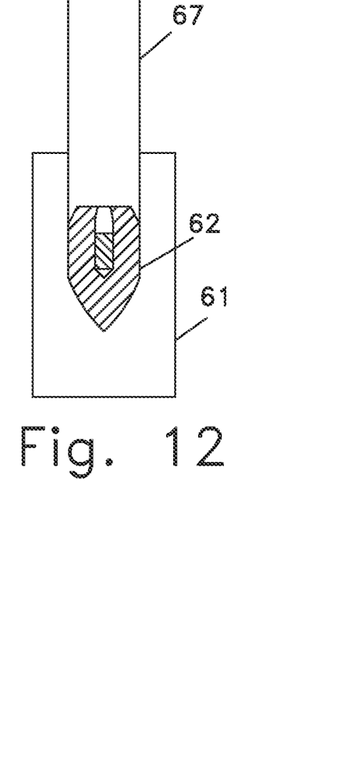
FIG. 12 is a section view of the die, slug, tag and punch with the punch advanced to swage the slug.

Referring to FIG. 12, the swaging punch is advanced to perform the swaging. The metal at the entrance to the recess is distorted in this embodiment to prevent the identification tag from coming out of the recess.

Figure 13:
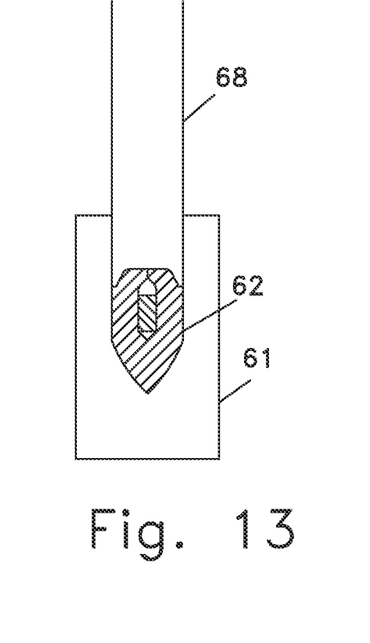
FIG. 13 is a section view of the die, slug, tag and punch with a second swaging punch 68 advanced to further swage the slug, forming a projectile.

In many variations of this embodiment, more than one swaging punch may be used to reach the final shape of the projectile. Referring to FIG. 13, a second swaging punch 68 further transforms the shape of the metal of the slug. In this variation, the swaging is sufficient to close the opening. Closing the opening has many advantages besides further reducing the chance of loss of the identification tag. Entry of gases during the discharge of the weapon firing the ammunition is prevented or reduced and environmental factors during the time prior to recovery of the projectile are sealed out.

Figure 14:
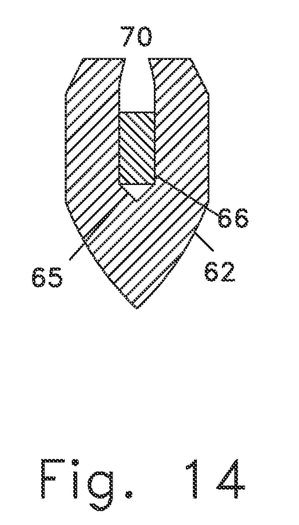
FIG. 14 is a section view of a slug with a recess 65 and an identification tag 66 which has been swaged to partially close an opening 70 to the recess, forming a projectile.
Figure 15:
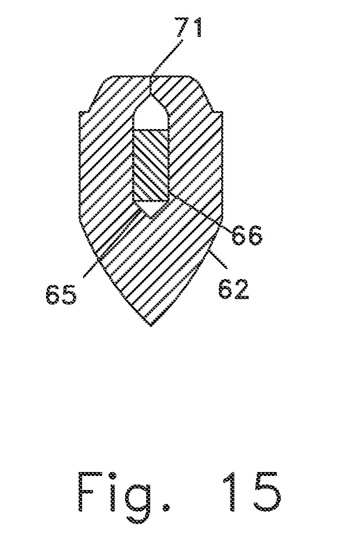
FIG. 15 is a section view of a slug with a recess 65 and an identification tag 66 which has been swaged to fully close an opening 71 to the recess, forming a projectile.
Figure 16:
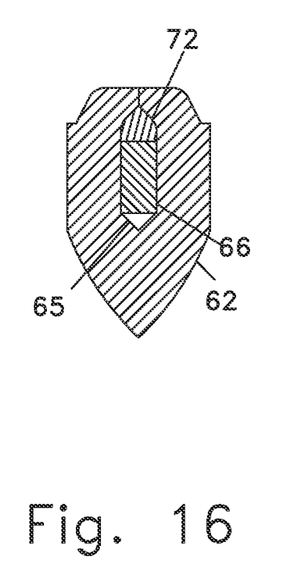
FIG. 16 is a section view of a slug with a recess 65 and an identification tag 66 which has had sealant 72 added and has been swaged to fully close an opening to the recess, forming a projectile.

FIGS. 14, 15 and 16 show respectively projectiles with a partially closed recess 70, a fully closed recess 71, and a fully closed recess further protected with sealant 72 which was placed in the recess prior to the final swaging process. A partially closed recess may be sufficient to protect the identification tag in some applications. In the depicted embodiment the walls of the recess have been swaged inward to retain the identification tag. The fully closed opening to the recess in FIG. 15 provides additional protection from environmental threats to the integrity of the tag. A sealant in FIG. 16 provides a complete barrier to the environment. The sealant may be a continuation of a protective coating for the identification tag which serves to protect indicia from either environmental factors or from mechanical damage resulting from the distortion of the projectile on impact.

Figure 17:
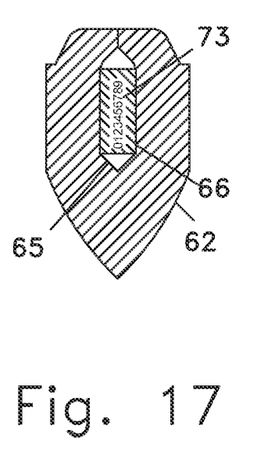
FIG. 17 is a section view of a swaged projectile 62 which has a recess 65 and an identification tag 66 with indicia 73.

Referring to FIG. 17, a projectile is shown after it is formed with an opening to the recess swaged closed. The identification tag 73 is shown with indicia 66. In the depicted embodiment the indicia are characters laser engraved into the surface of the tag. This is convenient for manufacture of tags with varying values to be conveyed by the indicia, but there are many other forms that the indicia may take in various embodiments. The indicia may be engraved, printed, formed or applied in other ways. They may be on the surface or embedded in the body of the identification tag. Indicia may be readable visually with or without the aid of optical instruments, or they may require reading and decoding with special equipment. Indicia may be electronically readable chips of silicon or other material. RFID or radio frequency identification chips may be readable after removal from the projectile, through the material of the projectile especially if part of the projectile is non-metallic, or readable with a probe that partially enters the projectile.

Figure 18:
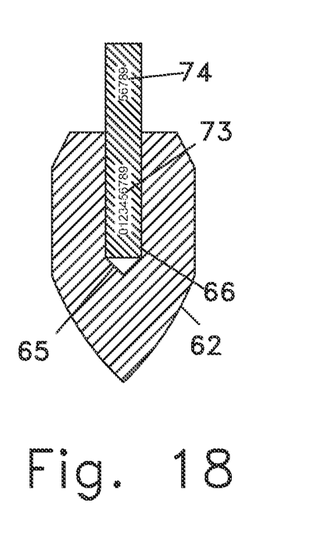
FIG. 18 is a section view of a swaged projectile 62 which has a recess 65 and contains an identification tag 66 with protected indicia 73 and exposed indicia 74.

Referring to FIG. 18, a projectile is shown with an identification tag 66. The recess 65 has been swaged to retain the tag but remains partially open allowing a portion of the tag to be exposed. In addition to the protected indicia 73 as in FIG. 17, there are external indicia 74 to allow non-destructive identification of the projectile. In the embodiment depicted the external indicia show only the least significant digits of the full number shown in the protected indicia 73. In this embodiment, the identification tag has straight sides and is retained by the pressure of the swaged material. In another embodiment the tag may have concave features in its shape that allow the swaged slug to make a more positive retention.

Figure 19:
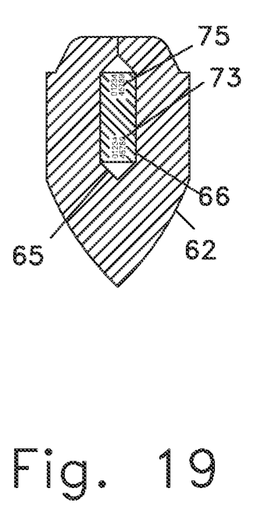
FIG. 19 is a section view of a swaged projectile 62 which has a recess 65 and contains an identification tag 66 with indicia 76 and a second set of indicia 75.
Figure 20:
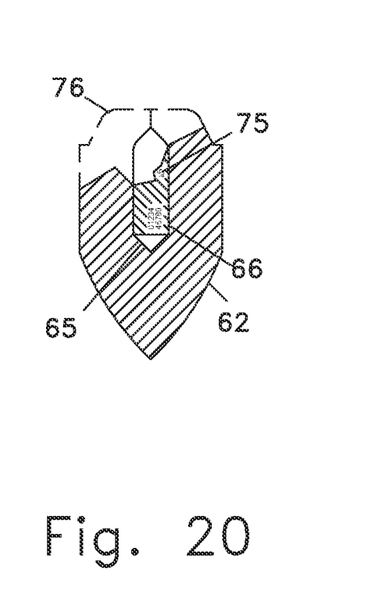
FIG. 20 is a section view of the projectile of FIG. 19 which has been used and shows damage 76.

Referring to FIG. 19, a projectile is shown with multiple indicia protected within the projectile. The additional indicia 75 in this embodiment duplicate the information in the first set of indicia 73. If the projectile is distorted or torn, the redundant sets of information increase the probability for recovery of the information in the indicia. FIG. 20 shows a projectile with damage 76. A portion of the identification tag 66 has been lost but the redundant information in the remaining set of indicia allows recovery of information.

Figure 21:
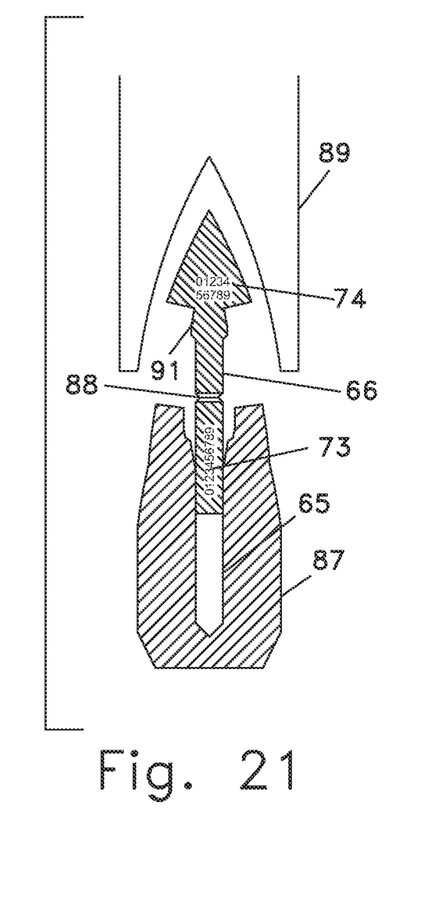
FIG. 21 is a section view of the components of a projectile to be assembled from a pre-swaged body 87 and a molded identification tag 66.

Referring to FIG. 21, an embodiment with several differences from the embodiments of FIGS. 7-20 is depicted. The identification tag 66 is here made by a molding process. It has protected indicia 73 and external indicia 74. The identification tag is inserted into recess 65 of the slug 87. The slug has been formed by prior swaging processes into a shape ready for final assembly by further swaging. In this embodiment the external indicia can be read after the projectile is assembled and further assembled with a case to become a complete ammunition cartridge. A swaging punch or tool 89 is shown in position to swage the slug around the identification tag to form a projectile.

The identification tag 66 shown in FIG. 21 also has a breakaway notch or groove 88. The function of the notch is to allow the identification tag to be broken or parted in a way that avoids the areas with indicia.

Figure 22:
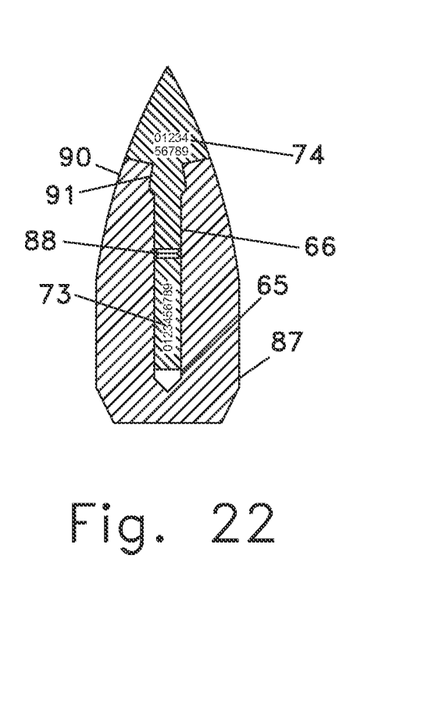
FIG. 22 is a section view of the projectile of FIG. 21 which has been assembled and has protected indicia 73 and exposed indicia 74.

Referring to FIG. 22, a projectile has been formed of the components of FIG. 21. A new contour 90 has been formed by the punch 89. The identification tag has a slanted surface 91 which received the swaged material of the slug to retain the identification tag in place.

Figure 23:
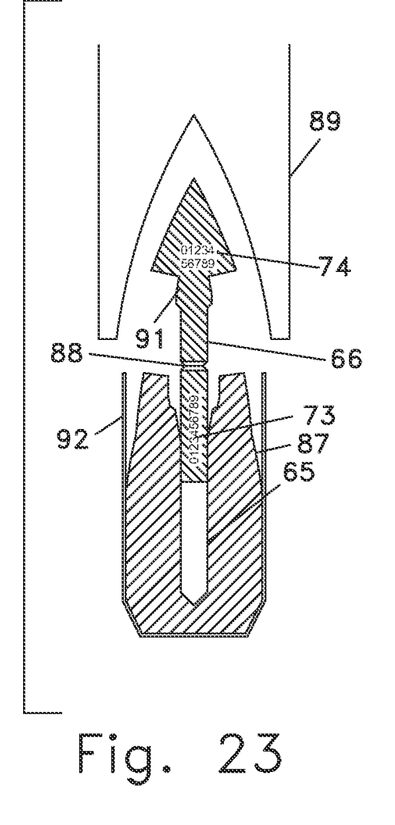
FIG. 23 is a section view of the components of a projectile to be assembled from a pre-swaged body 87, an identification tag 66 and a jacket 92.
Figure 24:
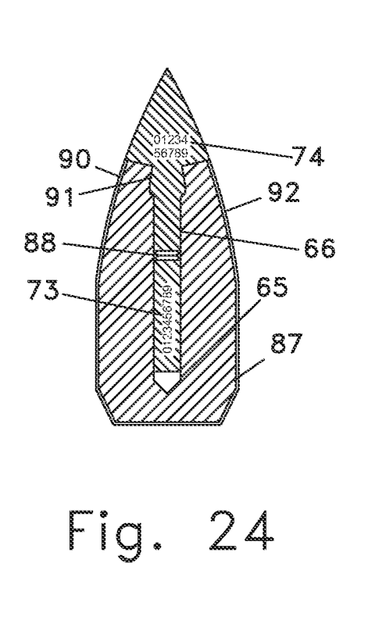
FIG. 24 is a section view of the projectile of FIG. 23 with a jacket 92, protected indicia 73 and exposed indicia 74.

Referring to FIG. 23, another embodiment is shown adding a jacket to the components of FIGS. 21 and 22. A jacket 92 of a different metal than the slug in the form of a cup is placed around the slug prior to the swaging to assemble the projectile. Referring to FIG. 14, when the swaging punch 89 is pressed down to assemble the projectile the cup is formed into the final shape of the jacket 92 which covers the formed slug 87. The proportions and contours of the slug prior to the final swaging are adjusted to allow for the material of the cup and to form the final contour 90 of the projectile.

Figure 25:
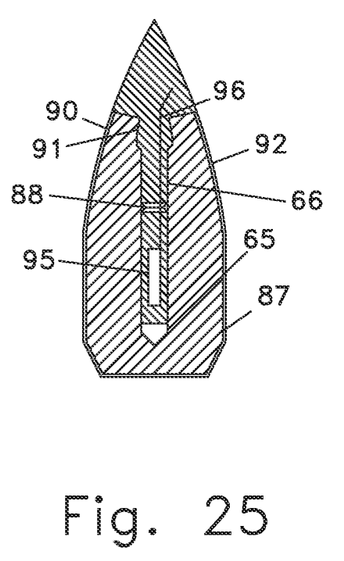
FIG. 25 is a section view of a projectile with a radio frequency identification tag 95.

Referring to FIG. 25, a projectile is shown with a radio frequency identification chip 95. The identification chip has an antenna 96 to facilitate reading data contained in the chip. The antenna is embedded in preferably non-metallic material of an identification tag 66. Because of its location and antenna the radio frequency identification chip constitutes both protected indicia and exposed indicia.

Figure 26:
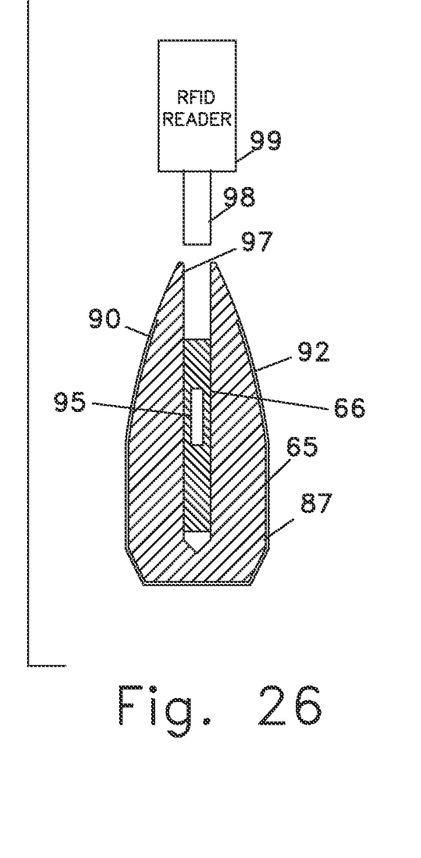
FIG. 26 is a section view of a projectile with a radio frequency identification tag 95, a nose opening 97. It also shows a radio frequency tag reading device 99 with a probe 98.

Referring to FIG. 26, a projectile is shown with a radio frequency identification chip 95 which is encased in an identification tag 96. The preferably non-metallic material of the identification tag is exposed at the bottom of a hollow nose opening 97 of the projectile. A radio frequency identification chip reading device 99 is shown with a probe 98 which fits into the opening to read the chip.

I claim:

1. A method for making an identifiable projectile for a firearm, comprising:
   extruding a tubular rod with a longitudinal cavity;
   inserting a non-metallic identification tag into the longitudinal cavity with identification information repeated along a length of the identification tag;
   reducing the area of a cross section of the longitudinal cavity by swaging to close the longitudinal cavity around the identification tag;
   parting a slug from the tubular rod subsequent to said reducing; and
   swaging the slug to form a projectile body comprising a portion of the identification tag within the slug, wherein the portion of the identification tag has a cross sectional area less than five percent of a cross sectional area of the projectile body.

2. The method of claim 1, wherein
   the identification tag comprises a second rod comprising a plurality of groups of indicia with each group signifying identification information and with at least two of the groups signifying redundant information.

3. The method of claim 2, wherein
   the slug comprises at least two groups of indicia with each group signifying redundant information.

4. The method of claim 1, further comprising:
   parting a plurality of slugs from the rod subsequent to said reducing.

5. The method of claim 4, wherein
   each slug comprises at least two groups of indicia with each group signifying redundant information.

6. The method of claim 1, wherein
   the identification tag comprises a wire filament and wherein the identification information comprises laser marked indicia repeated on the identification tag.

7. The method of claim 1, wherein
   the identification tag comprises a wire filament.

8. A method for making an identifiable projectile for a firearm, comprising:
   extruding a tubular rod with a longitudinal cavity;
   inserting a non-metallic identification tag comprising a plurality of groups of indicia with each group signifying identification information into the longitudinal cavity;
   reducing the area of a cross section of the cavity by swaging to close the longitudinal cavity around the identification tag;
   parting from the tubular rod a plurality of slugs subsequent to said reducing, each slug comprising a portion of the identification tag and at least one of the groups of indicia; and
   swaging each slug to retain the portion of the identification tag within the slug, wherein the portion of the identification tag has a cross sectional area less than five percent of a cross sectional area of the slug.

9. The method of claim 8, wherein
   each slug comprises a plurality of the groups of indicia with at least two of the groups signifying redundant information.

10. A method for making an identifiable projectile for a firearm, comprising:
    extruding a tubular rod with a longitudinal cavity larger than a cross section of a non-metallic identification tag wherein the identification tag has identification information repeated along the length of the identification tag;
    inserting the non-metallic identification tag into the longitudinal cavity;
    reducing the area of a cross section of the longitudinal cavity by swaging to close the longitudinal cavity around the identification tag;
    parting a slug comprising at least a portion of the identification tag from the tubular rod subsequent to said reducing; and
    swaging the slug to retain the portion of the identification tag within the slug, wherein the portion of the identification tag has a cross sectional area less than five percent of a cross sectional area of the slug.

* * * * *